(12) United States Patent
Sasaki et al.

(10) Patent No.: US 6,351,615 B2
(45) Date of Patent: *Feb. 26, 2002

(54) PHOTOGRAPHIC CAMERA EQUIPPED WITH MAGNETIC RECORDING HEAD AND MAGNETIC REPRODUCING HEAD

(75) Inventors: Wataru Sasaki; Hiroshi Komatsuzaki, both of Saitama (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,124

(22) Filed: Mar. 19, 1998

(30) Foreign Application Priority Data

Mar. 19, 1997 (JP) .............................................. 9-066983

(51) Int. Cl.⁷ ................................................ G03B 17/24
(52) U.S. Cl. ........................................ 396/319; 396/390
(58) Field of Search ................................. 396/310, 312, 396/319, 387, 389, 390, 418

(56) References Cited

U.S. PATENT DOCUMENTS

| 5,130,728 | A | * | 7/1992 | Goto et al. | 396/319 |
| 5,361,116 | A | * | 11/1994 | Funahashi | 396/319 |
| 5,617,161 | A | * | 4/1997 | Serita et al. | 396/319 |
| 5,724,621 | A | * | 3/1998 | Serita et al. | 396/284 |
| 5,727,240 | A | * | 3/1998 | Mizumoto et al. | 396/210 |
| 5,729,778 | A | * | 3/1998 | Sasaki | 396/319 |

* cited by examiner

Primary Examiner—David M. Gray
(74) Attorney, Agent, or Firm—Sughrue Mion, PLLC

(57) ABSTRACT

A camera for use with a film having a magnetic track extending along a longitudinal side of each image frame thereof is equipped with a magnetic recording head and a magnetic reproducing head located on one side of the magnetic recording head remote from a built-in film drive motor in close proximity to one side of the camera where a film winding spool or a film cartridge is located.

8 Claims, 4 Drawing Sheets

PHOTOGRAPHIC CAMERA EQUIPPED WITH MAGNETIC RECORDING HEAD AND MAGNETIC REPRODUCING HEAD

BACKGROUND OF THE INVENTION

1. Field of the Invention

The invention relates to a photographic camera for use with an APS film, and, more particularly, to a photographic camera equipped with a mid-roll-change function which permits a film cartridge with a film partly exposed and partly unexposed to be reloaded therein and automatically place a first unexposed image frame in the correct position of an exposure aperture. The present application is based upon Japanese Application No. 09-066983, which is incorporated herein by reference.

2. Description of Related Art

In recent years new standard photographic films and cameras prepared according to the requirements for what is called an advanced photographic system (APS) have been on the market. In particular, APS film has a magnetic layer coated over the surface thereof on which information including exposure data such as the type of illumination light and focal lengths and picture information such as titles and legends. The APS film is fully rewound within a light-sealed film cartridge after it has been fully or partly exposed and taken to a photoshop for processing and printing. The light-shielded film cartridge is loaded with the processed APS film and returned with or without prints to the customer.

One type of camera which uses APS film is equipped with a unique function called a mid-roll-change (MRC) function which permits the photographer to reload a film cartridge with a portion of the film remaining partly unexposed. This type of camera has a magnetic head for reproducing data recorded on magnetic tracks of the film. When the camera is reloaded with a film cartridge having a portion of the film remaining partly unexposed, it is automatically placed ready for taking a photograph by reading the data recorded on the magnetic tracks through the magnetic reproducing head and advancing the film automatically based on the data until a first unexposed image frame is placed in the exposure aperture.

Meanwhile, motor driven types of modern amateur cameras increasingly employ miniaturization. Many miniaturized motor driven cameras have a film drive motor installed in the interior of a cylindrical hollow film winding spool. However, miniaturization of an APS motor driven camera equipped with the MRC function imposes constraints on the layout of a magnetic recording head and a film drive motor. Specifically, since the APS camera of this kind makes recording of information on exposure data on the magnetic track for the exposed image frame during winding the film on the film winding spool, the magnetic recording head is typically disposed on one side of the exposure aperture close to the film winding spool. The smaller the APS camera is, the closer to the film winding spool the magnetic recording head must be disposed. An APS camera equipped with the MRC function needs to have a magnetic reproducing head, in addition to a magnetic recording head. Most APS cameras of this kind are typically equipped with a single magnetic head used for both recording and reproducing. For these reasons, in an APS camera of this type the magnetic recording/reproducing head is disposed in close proximity to the film winding spool in which a film drive motor is installed and, consequently, the magnetic recording/reproducing head is apt to be adversely affected by external induction noises (magnetic noises) generated by the film drive motor. These noises interfere with reproduced magnetic signals and cause errors in detecting a first unexposed image frame of the film rewound from the reloaded film cartridge.

In order for the APS camera equipped with the MRC function to be miniaturized to a desirable size and also to prevent generation and adverse effects of magnetic noises, it is essential to apply a double- or triple-shield to the film drive motor and the magnetic head. Most APS cameras of this kind are provided with a strictly shielded magnetic recording/reproducing head imposing structural restraints on the camera, which are always undesirable for miniaturization of the camera.

SUMMARY OF THE INVENTION

It is an object of the invention to provide a miniaturized APS camera equipped with a MRC function which permits a film drive motor to be simply shielded and also to prevent or significantly reduce external induction noises generated by the film drive motor.

The foregoing object of the invention is achieved by providing an APS camera with a mid-roll-change function of a type which automatically winds a film until a foremost unexposed image frame of an APS film is placed in an exposure position after a fresh film cartridge is loaded in the camera. In addition, the camera automatically winds a film cartridge with a partly exposed APS film contained therein when it is reloaded in the camera. The camera has a film winding spool located at one side of the camera and a film winding/rewinding mechanism including a reversible film drive motor to wind the film onto the film winding spool from a film cartridge located at another side of the camera and to rewind the film into the film cartridge. The camera comprises a magnetic recording head for making a magnetic recording of exposure data relating to exposure of an image frame on a magnetic track for the exposed image frame during advancement of the film after the exposure and a magnetic reproducing head for magnetically reading the exposure data on magnetic tracks for exposed image frames while a partly exposed film is drawn from the film cartridge reloaded in the camera and wound onto the film winding spool. The magnetic reproducing head is located on one side of the magnetic recording head remote from the film drive motor located in close proximity to one side of the camera in a direction in which the film is advanced. The film drive motor is stopped to interrupt drawing of the partly exposed film when the magnetic reproducing head reads no exposed data on the magnetic track to place an unexposed image frame to which the magnetic track belongs in the exposure position. More specifically, the magnetic reproducing head is located in a position where the magnetic reproducing head reads a magnetic track for an image frame prior to placing the image frame to which the magnetic track belongs properly in the exposure position.

In the camera in which the film drive motor is located in close proximity to one side of the camera at which the film winding spool is installed or is installed within the interior of the cylindrical hollow film winding spool, the magnetic reproducing head is located on a side of the magnetic recording head remote from the film winding spool. On the other hand, in the camera in which the film drive motor is located in close proximity to another side of the camera at which the film cartridge is loaded, the magnetic reproducing head is located on a side of the magnetic recording head close to the film winding spool.

The arrangement of the magnetic reproducing head located sufficiently far from the film drive motor makes it easy to isolate the magnetic reproducing head from magnetic noises generated by the film drive motor or to significantly reduce adverse effects of magnetic noises generated by the film drive motor to the magnetic reproducing head and, in addition, permits the magnetic heads and the film drive motor to be simply shielded, a feature which is always desirable for miniaturization of the camera. In the case where the film drive motor is located in close proximity to the side of the camera at which a film cartridge is loaded, the magnetic recording head provides an effect of cleaning the magnetic tracks or removing dust on the magnetic tracks. As a consequence, the magnetic recording head protects the magnetic reproducing head, which is more sensitive to dust as compared with the magnetic recording head, from encountering dust.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote same or similar parts or elements throughout the drawings and in which.

DETAILED DESCRIPTION OF THE INVENTION

Figure 1:
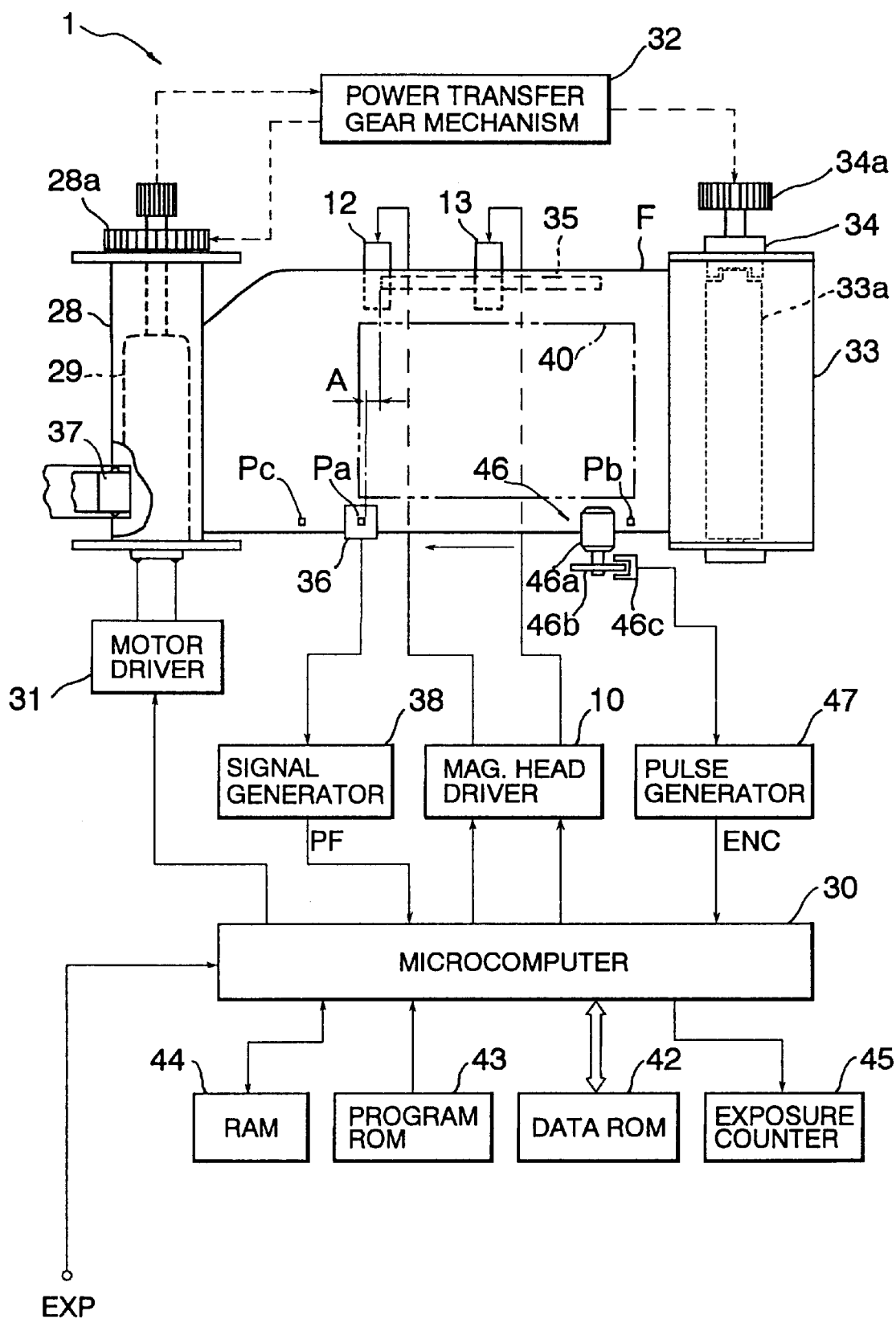
FIG. 1 is an illustration schematically showing an APS camera equipped with a mid-roll-change function in accordance with an embodiment of the present invention.

Since camera body construction, exposure systems including taking lens systems, apertures and shutter mechanisms, view finder systems, automatic loading mechanisms and other mechanisms and parts necessary to a camera are well known in construction and operation to those skilled in the art, the following description will be directed in particular to elements forming part of, or cooperating directly with, a camera in accordance with the invention. Same reference numerals have been used to denote the same or similar elements or parts throughout the specification.

Referring to the drawings in detail, FIG. 1 schematically shows an automatic film loading type of camera 1 equipped with a mid-roll-change function in accordance with an embodiment of the invention, which is designed in accordance with the requirements for the advanced photographic system (APS). The camera 1 has a film advancing, or winding/rewinding, mechanism comprising a film drive motor, such as a reversible motor 29, and a power transfer gear mechanism 32, schematically shown with block and gears 28a and 34a which form part of the power transfer gear mechanism 32. The film drive motor 29 has a cylindrical shape and is installed in the interior of a generally cylindrically-shaped film winding spool 28 disposed at one side of the camera. Gear 28a may be integral with, or otherwise fixed to, a film winding spool 28, and gear 34a has a coaxial forked projection 34 which engages one end of a cartridge spool 33a installed in the interior of a film cartridge 33 disposed at another side of the camera. The film drive motor 29 is controlled to rotate in two directions, namely a film winding or forward direction shown by an arrow to wind a film F from the film cartridge 33 and a film rewinding or reverse direction to rewind the film F into the film cartridge 33. The control of the film drive motor 29 is accomplished by means of a microcomputer (MC) 30 as a camera control unit through a motor driver 31. When a back lid of the camera is closed after loading a film cartridge 33 or when the microcomputer 30 receives a signal EXP immediately after a shutter release, the film drive motor 29 is actuated to rotate in the forward direction, and when a film rewind button (not shown) is operated, the film drive motor 29 is actuated to rotate in the reverse direction. The power transfer gear mechanism 32 is controlled by means of the microcomputer 30 to switch its power transmission path between the gears 28a and 34a. Specifically, the power transfer gear mechanism 32 connects rotation of the film drive motor 29 selectively to the film winding spool 28 via the gear 28a and to a cartridge spool 33a engaged by the hooked projection 34 via the gear 34a. The film winding spool 28 has a coarse surface and is pressed by a pinch roller 37 to catch the leading end of the film F during automatic film loading.

The film F is coated with a transparent magnetic layer over the entire surface of its base and is partly used as tracks 35 for magnetic recording. Further, the film F is formed with a row of perforations. Each image frame of the film F is accompanied by two perforations, namely a front end perforation Pa laterally adjacent to the front end of the image frame and a rear end perforation Pb laterally adjacent to the rear side of the image frame. The front end of the magnetic track 35 for an exposure frame in the position of an exposure aperture 40 is located at a specified distance A from the front end perforation Pa for the same image frame in a lengthwise direction. The row of perforations includes an extra perforation Pc ahead of the front perforation Pa for the first image frame.

The camera 1 is provided with a perforation sensor such as a reflection type of photoelectric sensor 36 for detecting the perforations Pa, Pb and Pc. Various types of photoelectric sensors are known in the art, and the photoelectric sensor 36 may be comprised of any well known type. This photoelectric sensor 36 is adapted to generate photoelectric output whenever it detects a perforation and then transmits the output to the signal generator 38. The signal generator 38 generates perforation signals PF, one for each photoelectric output from the photoelectric sensor 36, and sends them to the microcomputer 30. Whenever the microcomputer 30 receives two perforation signals PF, it provides one motor control signal for the motor driver 31 to stop the film drive motor 29. Accordingly, when the photoelectric sensor 36 detects the first two perforations, (i.e., the extra perforation Pc and the front end perforation Pa adjacent to the first image frame) the motor driver 31 stops the film drive motor 29 to place the first image frame of the film F in position at the exposure aperture 40. Thereafter, whenever the photoelectric sensor 36 detects another two perforations, (i.e., a rear end perforation Pb adjacent to an image frame of the film F and a front end perforation Pa adjacent to the following image frame of the film F after every exposure) the motor driver 31 stops the film drive motor 29 to place the following image frame of the film F in position at the exposure aperture 40.

The camera 1 is further provided with a magnetic recording head 12 for recording data on the magnetic track 35 and a magnetic reproducing head 13 for reading and reproducing the data on the magnetic track 35. These magnetic heads 12 and 13 are located in vertically remote positions from the exposure aperture 40 and are separated at a specified distance in the lengthwise direction. In one embodiment, the magnetic reproducing head is disposed from the magnetic recording head by a distance which is equal to or less than a length of the image frame. The magnetic recording head 12 is actuated by a magnetic head driver 10 during advancement of the film F to record information on binary-coded exposure data relating to exposure of an image frame including, for example, a shutter speed, an aperture size, etc., on the magnetic track 35 for the exposed image frame. Prescribed binary-coded data relating to exposure is stored in a data ROM 42 which, in turn, is connected to the microcomputer 30.

A camera control program which includes a film advancement control sequence routine, an exposure control sequence routine and a magnetic head control sequence routine is stored in a program ROM 43 which, in turn, is connected to the microcomputer 30. A RAM 44 is used to temporarily store data necessary to execute the exposure control sequence routine and the magnetic head control sequence routine. Binary-coded exposure data is written in the RAM 44 prior to recording of the exposure data on the magnetic track 35 by means of the magnetic recording head 12.

An encoder 46 provided to avoid a change in bit rate even if the speed of advancement of the film F varies, comprises a pinch roller 46a driven by the film F, an encoder disk 46b formed with a number of radial slits at regular angular intervals and capable of rotating together with the pinch roller 46a, and a photoelectric sensor 46c for providing a photoelectric signal for every detection of the slit of the rotary disk 46b. A pulse generator 47 provides pulses ENC, one for every specified number of photoelectric signals from the encoder 46, to detect the length of advancement of the film F. The microcomputer 30 monitors intervals of these pulses ENC to provide the magnetic head driver 10 with instruction signals to drive the recording magnetic head 12 to make a recording. Specifically, the recording magnetic head 12 reverses its magnetic field according to binarized signal of "1" or "0" within a specified length of film advancement in response to the instruction signals. The magnetic reproducing head 13 is actuated by the magnetic head driver 10 to read binary-coded data on the magnetic tracks 35 of a film F during advancement of the film F drawn from a re-loaded film cartridge 33. The microcomputer 30, on one hand, monitors intervals of pulses ENC generated by the encoder 46 and, on the other hand, reads the binary-coded data read by the magnetic reproducing head 12 and decoded by a data reproducing circuit incorporated in the magnetic head driver 10 to detect a first unexposed image frame of the film F.

Figure 2:
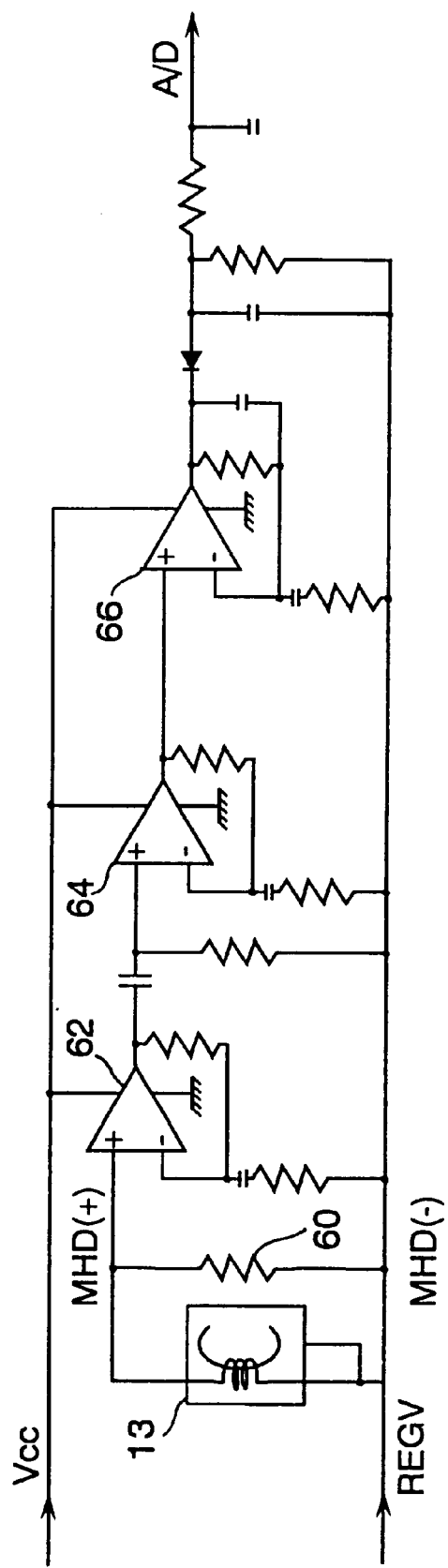
FIG. 2 is a diagram of a reproducing circuit of a magnetic head driver.

FIG. 2 is a diagram of the data reproducing circuit incorporated in the magnetic head driver 10. The data reproducing circuit comprises a resistance 60 to convert an electric current (MHC) passing through a coil of the magnetic reproducing head 13 into a voltage signal and operational amplifiers 62, 64 and 66 to non-inversely amplify the voltage signal in three steps and to output an analog-to-digital converted signal. A driving voltage Vcc of 5 volts is supplied to the operational amplifiers 62, 64 and 66, and a reference voltage REGV of 2.3 volts is supplied to the inverted input terminals of each of the operational amplifiers 62, 64, 66. The microcomputer 30 provides an instruction signal for a regulator (not shown) to supply or shut off the driving voltage Vcc to the operational amplifiers 62, 64 and 66 during advancement of the film F.

As was previously described, the magnetic recording head 12 is installed in a position close to one end of the exposure aperture 40 and separated by a specified distance from the photoelectric sensor 36 in a lengthwise direction which is equal to the distance A provided between the rear edge of the front perforation Pa and the front end of the magnetic track 35 for each image frame. Specifically, the distance A includes a recognition tolerance of the photoelectric sensor 36 and an installation tolerance of the photoelectric sensor 36 and the magnetic recording head 12. With the arrangement of the magnetic recording head 12 relative to the photoelectric sensor 36, the magnetic recording head 12 starts recording of data on the magnetic track 35 as soon as commencement of advancement of the film F after exposure.

The magnetic reproducing head 13 is installed in a position closer to another end of the exposure aperture 40 than the position in which the magnetic recording head 12 is installed to read data on the magnetic tracks 35 during advancement of the film F drawn from a reloaded film cartridge 33. In the case where a film cartridge 33 having a partly exposed film F is reloaded in the camera and the film F is automatically wound onto the film winding spool 28, the microcomputer 30 causes the motor driver 31 to make the film drive motor 29 remain actuated as long as the magnetic reproducing head 13 is reading a magnetic track 35 on which data has been recorded even though it receives perforation signals PF from the signal generator 38.

However, when the magnetic reproducing head 13 is reading a magnetic track 35 without data recorded thereon, this indicates that an image frame to which the magnetic track 35 belongs has been unexposed. The microcomputer 30 causes the motor driver 31 to stop the film drive motor 29 as soon as receiving two consecutive perforation signals PF. Specifically, perforation signals PF are generated by the signal generator 38 when the perforation sensor 36 detects a rear perforation Pb for an image frame first and subsequently detects a front perforation Pa for the unexposed image frame following the previous exposed image frame. As a result, the unexposed image frame is placed in the position of the exposure aperture 40.

In order to detect an unexposed image frame, it is not always necessary to read the entire length of a magnetic track 35 but enough to read only initial part of the magnetic track 35 before the perforation sensor 36 detects a rear perforation Pb for an image frame first and subsequently a front perforation Pa for another image frame following the previous image frame. The magnetic reproducing head 13 is located at a distance from the photoelectric sensor 36 which is longer than the distance between the front perforation Pa and the front edge of the magnetic track 35 but is shorter than the distance between the rear perforation Pb for an image frame immediately ahead of the image frame and the front edge of the magnetic track 35 for the image frame.

In the camera according to the embodiment shown in FIG. 1, the magnetic reproducing head 13 is located at a distance from the photoelectric sensor 36 approximately equal to the distance between the rear perforation Pb for an image frame and the front edge of the magnetic track 35 for an image frame immediately after the image frame to which the rear perforation Pb belongs. Accordingly, the magnetic reproducing head 13 in the embodiment reads part of the magnetic track 35 the length of which is equal to the distance between each adjacent rear and front perforations Pb and Pa for adjacent image frames.

The magnetic reproducing head 13 is located on one side of the magnetic recording head 12 remote from the film drive motor 29. This arrangement of the magnetic reproducing head 13 relative to the film drive motor 29 prevents or significantly reduces adverse effects of external induction noises (magnetic noises) generated by the film drive motor 29 on the magnetic reproducing head 13. As a result of this arrangement, even if the magnetic reproducing head 13 and the film drive motor 29 are magnetically shielded by simplified shielding cases (which is always desirable for a miniaturized camera), an error caused by an unexposed image frame being wrongly recognized as an exposed image frame is prevented, such that a first unexposed image frame of a reloaded film F is precisely placed in the exposure position for exposure.

Figure 3:
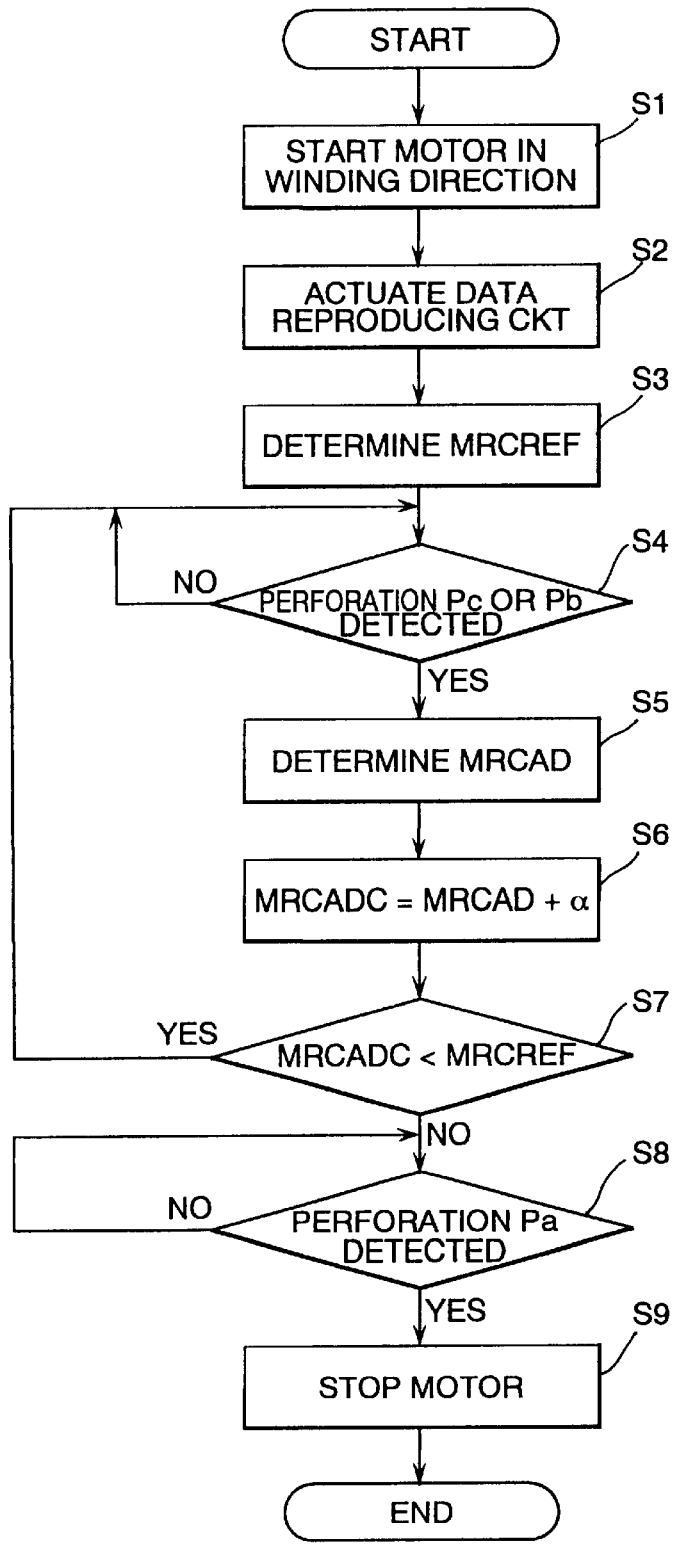
FIG. 3 is a flow chart illustrating a mid-roll-change control sequence routine.

The operation depicted in FIG. 1 is best understood by reviewing FIG. 3, which is a flow chart illustrating the mid-roll-change sequence routine for the microcomputer 30. Because programming a computer is a skill well understood in the art, the following explanation is written to enable programmers having ordinary skill in the art to furnish an appropriate program for the microcomputer 30. The particular details of such program would of course depend upon the architecture of the particular computer used.

Referring to FIG. 3, when a film cartridge 33 with a film F having a portion partly exposed and a portion partly unexposed is reloaded in an automatic loading type of camera, the flow chart logic commences and control proceeds directly to a function block at step Sl where the microcomputer provides a start signal to cause the motor driver 31 to actuate the film drive motor 29 in the film winding direction, thereby winding the leading portion of the film F onto the film winding spool 28. As soon as the film drive motor 29 starts to rotate, the microcomputer 30 supplies a driving voltage Vcc of 5 volts and a reference voltage REGV of 2.3 volts to the data reproducing circuit incorporated in the magnetic head driver 10 to actuate the data reproducing circuit at step S2. The magnetic reproducing head 13 is energized so as to be ready for reading magnetic tracks 35.

Before the magnetic reproducing head 13 reads a magnetic track 35 with data recorded thereon, the microcomputer 30 recognizes an environment of noises based on signals detected by the magnetic reproducing head 13 to determine a signal discrimination level MRCREF at step S3. This signal discrimination level MRCREF is calculated as an average level of a plurality of noise signals after analog-to-digital conversion through the data reproducing circuit of the magnetic head driver 10. Subsequently, a determination is made at step S4 as to whether the photoelectric sensor 36 detects an extra perforation Pc or a rear perforation Pb. This determination is repeated until the photoelectric sensor 36 detects the extra perforation Pc.

When the photoelectric sensor 36 detects the extra perforation Pc, the microcomputer 30 recognizes a magnetic environment of the magnetic track 35 for the first image frame based on signals detected by the magnetic reproducing head 13 to determine a signal discrimination level MRCAD at step S5. This signal discrimination level MRCAD is calculated as an average level of a plurality of noise signals after analog-to-digital conversion through the data reproducing circuit of the magnetic head driver 10. After modifying the signal discrimination level MRCAD as a critical level MRCADC by adding a margin a thereto at step S6, the signal discrimination level MRCREF is compared with the critical level MRCADC to determine whether magnetic signals have been recorded on the magnetic track 35 at step S7. If the critical level MRCADC is lower than the signal discrimination level MRCREF, this indicates that magnetic signals are recorded on the magnetic track 35, and thus, the determination concerning the detection of a rear perforation Pb is made in spite of detecting the front perforation Pa at step S4. These steps S4 through S7 are repeated until the critical level MRCADC becomes equal to or higher than the signal discrimination level MRCREF.

When it is detected that the critical level MRCADC is equal to or higher than the signal discrimination level MRCREF, this indicates that no magnetic signal is recorded on the magnetic track 35, and determination is then made at step S8 as to detection of two consecutive perforations. Specifically, detection is made of a rear perforation Pb for a previous image frame and a front perforation Pa for an image frame adjacent to the previous image frame. When the photoelectric sensor 36 detects the front perforation Pa for the image frame adjacent to the previous image frame, this indicates that the image frame has been unexposed. The microcomputer 30 then causes the motor driver 31 to stop the film drive motor 29 at step S9, thereby properly placing the unexposed image frame in the position of the exposure aperture 40. In this way, when a film cartridge 33 having a film F with a portion partly exposed and a portion partly unexposed is reloaded in the camera, a first unexposed image frame is automatically placed in the position of the exposure aperture 40 and made ready for taking a photograph. As a result, the unexposed image frame is automatically placed in the position of the exposure aperture 40.

As long as the magnetic reproducing head 13 is located on one side of the magnetic recording head 12 remote from the film drive motor 29, the film drive motor 29 may be arranged in close proximity to, but not within, the hollow cylindrical film winding spool 28 with the similar result of preventing or significantly reducing adverse effects of external induction noises (magnetic noises) generated by the film drive motor 29 to the magnetic reproducing head 13.

Figure 4:
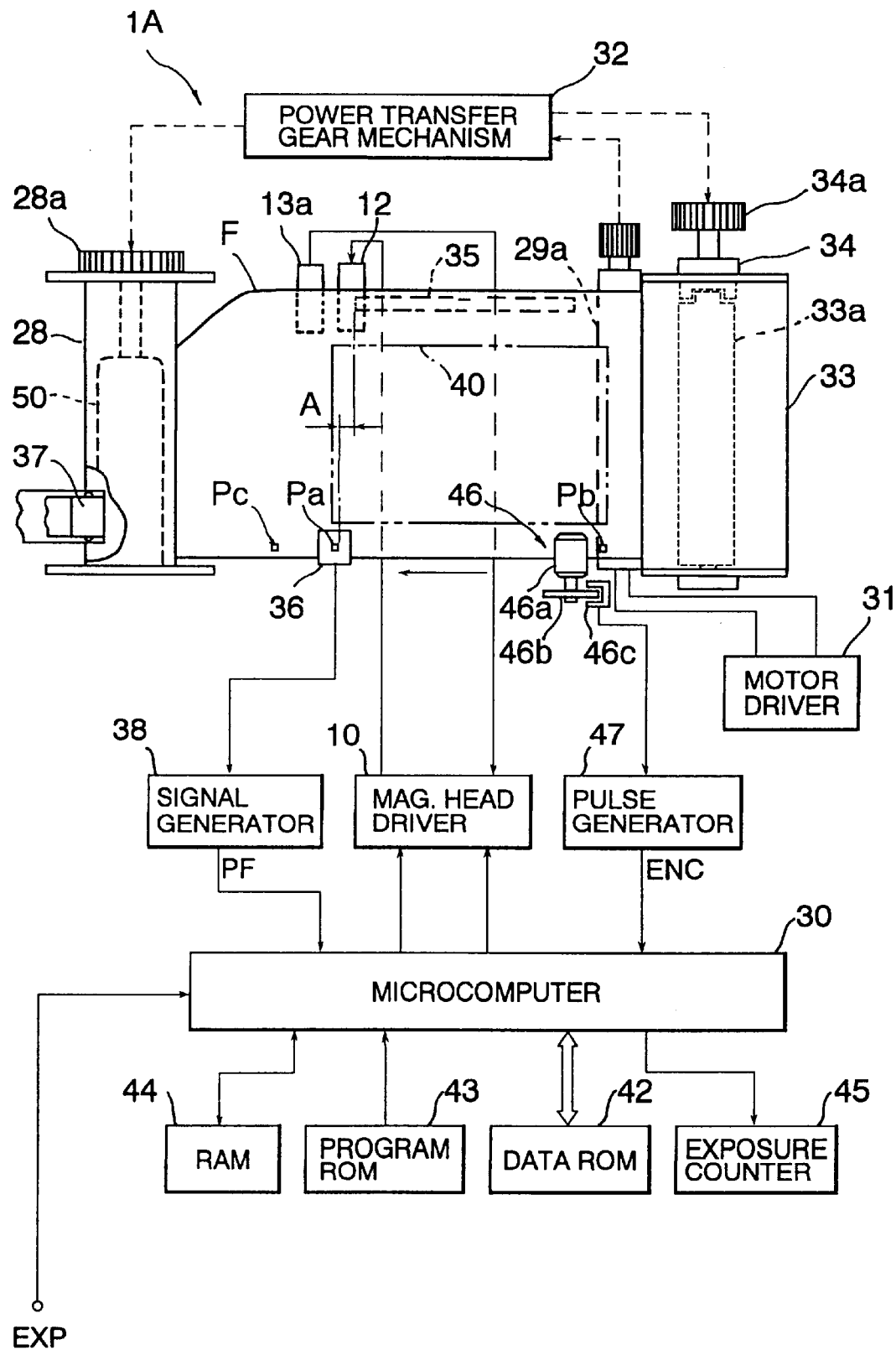
FIG. 4 is an illustration schematically showing a camera equipped with a mid-roll-change function in accordance with another embodiment of the present invention.

FIG. 4 schematically shows a MRC type of automatic film loading camera 1A in accordance with another embodiment of the invention. Camera 1A is designed and prepared in accordance with the requirements for the advanced photographic system (APS) and equipped with a built-in electronic flash device (not shown), and magnetic recording and reproducing heads. The camera 1A has a magnetic reproducing head 13a located on one side of a magnetic recording head 12 close to a film winding spool 28. As shown in FIG. 4, the camera 1A has a film advancing, or winding/rewinding, mechanism comprising a film drive motor such as a reversible motor 29a, a power transfer gear mechanism 32 and gears 28a and 34a forming part of the power transfer gear mechanism 32. The film drive motor 29a is installed in close proximity to a film cartridge 33. In the interior of a generally cylindrical-shaped film winding spool 28 there is installed a capacitor 50 forming a part of the built-in electronic flash device.

The camera 1A is arranged having the film drive motor 29a provided with a magnetic recording head 12 located in close vicinity to one side of an exposure aperture 40 remote from the film drive motor 29a in the lengthwise direction and a magnetic reproducing head 13a located on one side of the magnetic recording head 12 close to the film winding spool 28. Specifically, the magnetic reproducing head 13a is located at a distance from the magnetic recording head 12 that is shorter than the distance between the extra perforation Pc or the rear perforation Pb for a previous image frame and the leading end of the magnetic track 35 for an image frame which is approaching the magnetic reproducing head 13a.

This arrangement of the magnetic reproducing head 13a relative to the film drive motor 29a prevents or significantly reduces adverse effects of external induction noises (magnetic noises) generated by the film drive motor 29a on the magnetic reproducing head 13a and provides an effect of removing dust on a film F by the magnetic recording head 12. As a result, the magnetic reproducing head 13a which is more sensitive to dust as compared with the magnetic recording head 12 is protected from encountering dust.

In the case where a film drive motor is not located in parallel to the film winding spool 28 but instead, horizontally at the bottom of the camera 1 or 1A, either arrangement of the magnetic reproducing head (i.e., 13 or 13a) provides a long distance between the magnetic reproducing head (i.e., 13 or 13a) and a brush mechanism of the film drive motor which is a main source of magnetic noises, thus protecting the magnetic reproducing head (i.e., 13 or 13a) against adverse effects of magnetic noises generated by the film drive motor.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A camera for use with a film cartridge with a roll of film having a magnetic layer that is pre-wound around a cartridge spool, said camera comprising:

a film winding spool disposed at one end of said camera;

a film winding mechanism including a reversible motor for selectively driving said film winding spool to wind said film around said film winding spool and said film cartridge spool to rewind said film into said film cartridge;

a magnetic recording head for recording data relating to an image frame on an area of said magnetic layer assigned to said image frame during winding of said film after exposure of said image frame; and a magnetic reproducing head for reading data on an area of said magnetic layer assigned to each said image frame during winding of said film;

wherein said magnetic reproducing head is disposed from said magnetic recording head by a distance which is equal to or less than a length of said image frame on one side of said magnetic recording head remote from said film winding spool; and wherein said reversible motor is located proximate said film winding spool.

2. The camera as defined in claim 1, wherein said magnetic reproducing head is located in a position in which said magnetic reproducing head reads an area of said magnetic layer for an image frame prior to placing said image frame in an exposure position, and said film winding/rewinding mechanism stops winding of said film when said magnetic reproducing head reads an area of said magnetic layer having no recorded data.

3. A camera for use with a film cartridge with a roll of film having a magnetic layer that is pre-wound around a cartridge spool, said camera comprising:

a film winding spool disposed at one end of said camera;

a film winding mechanism including a reversible motor for selectively driving said film winding spool to wind said film around said film winding spool and said film cartridge spool to rewind said film into said film cartridge;

a magnetic recording head for recording data relating to an image frame on an area of said magnetic layer assigned to said image frame during winding of said film after exposure of said image frame; and a magnetic reproducing head for reading data on an area of said magnetic layer assigned to each said image frame during winding of said film;

wherein said magnetic reproducing head is disposed from said magnetic recording head by a distance which is equal to or less than a length of said image frame on one side of said magnetic recording head remote from said film winding spool; and wherein said reversible motor is incorporated within an interior of said film winding spool.

4. A camera for use with a film having a magnetic track extending along a longitudinal side of each image frame, wherein said camera is configured to automatically wind the film until a foremost unexposed image frame of the film is placed in an exposure position when a cartridge containing fresh film is loaded in the camera and also when a film cartridge containing a partly exposed film is reloaded in the camera, said camera having a winding spool located at one side of the camera, said camera having a film winding/rewinding mechanism including a reversible motor to wind the film onto the film winding spool from a film cartridge at another side of the camera and to rewind the film into the film cartridge, said camera comprising:

a magnetic recording head for recording exposure data relating to exposure of an image frame on the magnetic track for the exposed image frame during advancement of the film onto the film winding spool by one image frame after said exposure;

a magnetic reproducing head for magnetically reading said exposure data recorded on magnetic tracks for exposed image frames while the partly exposed film is drawn from the film cartridge reloaded in the camera and wound on the film winding spool; and control means for stopping said reversible motor to interrupt said drawing of said partly exposed film when said magnetic reproducing head reads no said exposure data on said magnetic track;

wherein said magnetic reproducing head is disposed from said magnetic recording head by a distance which is equal to or less than a length of said image frame on one side of said magnetic recording head remote from said reversible motor; and wherein said reversible motor is located on one side of the camera at which said film cartridge is loaded.

5. The camera as defined in claim 4, wherein said magnetic reproducing head is located in a position in which said magnetic reproducing head reads a magnetic track for an image frame prior to placing said image frame in an exposure position, and said film winding/rewinding mechanism stops winding of said film when said magnetic reproducing head reads a magnetic track having no recorded data.

6. A camera for use with a film having a magnetic track extending along a longitudinal side of each image frame, wherein said camera is configured to automatically wind the film until a foremost unexposed image frame of the film is placed in an exposure position when a cartridge containing fresh film is loaded in the camera and also when a film cartridge containing a partly exposed film is reloaded in the camera, said camera having a winding spool located at one side of the camera, said camera having a film winding/rewinding mechanism including a reversible motor to wind the film onto the film winding spool from a film cartridge at another side of the camera and to rewind the film into the film cartridge, said camera comprising:

a magnetic recording head for recording exposure data relating to exposure of an image frame on the magnetic track for the exposed image frame during advancement of the film onto the film winding spool by one image frame after said exposure;

a magnetic reproducing head for magnetically reading said exposure data recorded on magnetic tracks for exposed image frames while the partly exposed film is drawn from the film cartridge reloaded in the camera and wound on the film winding spool; and control means for stopping said reversible motor to interrupt said drawing of said partly exposed film when said magnetic reproducing head reads no said exposure data on said magnetic track;

wherein said magnetic reproducing head is disposed from said magnetic recording head by a distance which is equal to or less than a length of said image frame on one side of said magnetic recording head remote from said reversible motor; and wherein said reversible motor is incorporated within an interior of said film winding spool.

7. A camera for use with a film having a magnetic track extending along a longitudinal side of each image frame, wherein said camera is configured to automatically wind the film until a foremost unexposed image frame of the film is placed in an exposure position when a cartridge containing fresh film is loaded in the camera and also when a film cartridge containing a partly exposed film is reloaded in the camera, said camera having a winding spool located at one side of the camera and a film winding/rewinding mechanism, said camera comprising:

a reversible motor for driving the film winding/rewinding mechanism to wind the film onto the film winding spool from a film cartridge located at another side of the camera and to rewind the film into the film cartridge;

a magnetic recording head for recording exposure data relating to exposure of an image frame on the magnetic track for the exposed image frame during advancement of the film onto the film winding spool by one image frame after said exposure;

a magnetic reproducing head for magnetically reading said exposure data on magnetic tracks for exposed image frames while the partly exposed film is drawn from the film cartridge reloaded in the camera and wound on the film winding spool; and control means for stopping said motor to interrupt the drawing of said partly exposed film when said magnetic reproducing head reads no said exposure data on said magnetic track;

wherein said magnetic reproducing head is located at a distance from said reversible motor longer than a distance from said reversible motor at which said magnetic recording head is disposed and wherein said magnetic reproducing head is disposed from said magnetic recording head by a distance which is equal to or less than a length of said image frame; and wherein said reversible motor is located on one side of the camera at which said film cartridge is loaded.

8. A camera for use with a film having a magnetic track extending along a longitudinal side of each image frame, wherein said camera is configured to automatically wind the film until a foremost unexposed image frame of the film is placed in an exposure position when a cartridge containing fresh film is loaded in the camera and also when a film cartridge containing a partly exposed film is reloaded in the camera, said camera having a winding spool located at one side of the camera and a film winding/rewinding mechanism, said camera comprising:

a reversible motor having for driving the film winding/rewinding mechanism to wind the film onto the film winding spool from a film cartridge located at another side of the camera and to rewind the film into the film cartridge;

a magnetic recording head for recording exposure data relating to exposure of an image frame on the magnetic track for the exposed image frame during advancement of the film onto the film winding spool by one image frame after said exposure;

a magnetic reproducing head for magnetically reading said exposure data on magnetic tracks for exposed image frames while the partly exposed film is drawn from the film cartridge reloaded in the camera and wound on the film winding spool; and control means for stopping said motor to interrupt the drawing of said partly exposed film when said magnetic reproducing head reads no said exposure data on said magnetic track;

wherein said magnetic reproducing head is located at a distance from said reversible motor longer than a distance from said reversible motor at which said magnetic recording head is disposed and wherein said magnetic reproducing head is disposed from said magnetic recording head by a distance which is equal to or less than a length of said image frame; and wherein said reversible motor is incorporated within an interior of said film winding spool.

* * * * *